T. McDOWELL.
MODE OF PRODUCING HOT BLAST IN FURNACES.
No. 75,442.                      Patented Mar. 10, 1868.
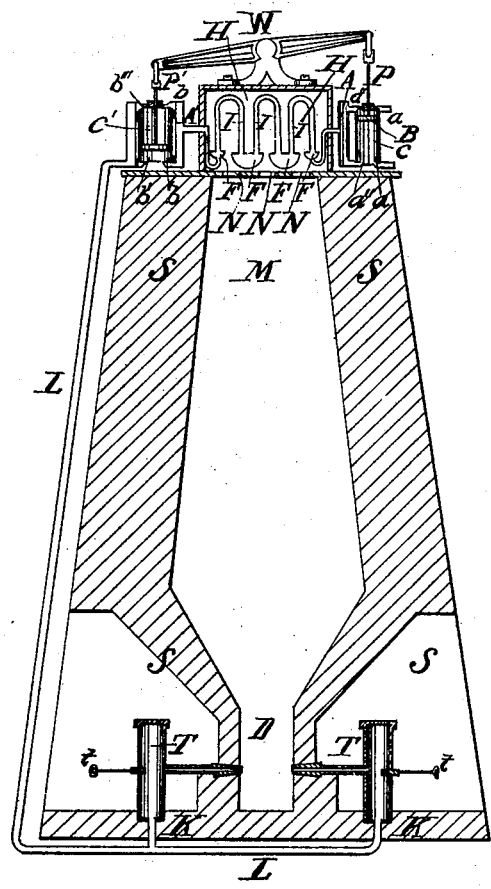
Witnesses
C. A. Pettit
J. W. Meister
Inventor
Thomas McDowell
by Munn & Co.
Attorneys

United States Patent Office.

THEODORE McDOWELL, OF LIGHT STREET, PENNSYLVANIA, ASSIGNOR TO T. McDOWELL AND A. McDOWELL.

*Letters Patent No. 75,442, dated March 10, 1868.*

---

IMPROVED MODE OF PRODUCING HOT-BLAST IN FURNACES.

---

*The Schedule referred to in these Letters Patent and making part of the same.*

---

TO ALL WHOM IT MAY CONCERN:

Be it known that I, THEODORE McDOWELL, of Light Street, in the county of Columbia, and State of Pennsylvania, have invented a new and improved Method of Producing Hot-Blast for Furnaces; and I do hereby declare the following to be a clear, full, and exact description of the same, reference being had to the accompanying drawings, forming part of this specification.

The drawings represent a sectional elevation of my invention as applied to cupola-furnaces.

Similar letters of reference indicate corresponding parts in the drawings.

This invention relates to a novel method of obtaining a hot-blast for cupola or other furnaces by means of a hot-air engine and air-pump, the former being operated by the waste heat from the furnace.

In the drawings, S represents a perpendicular section through the centre of a cupola-furnace, upon the top of which are located the hot-air engine and air-pump, and the devices for operating them. $c$ represents the air-pump, constructed in the usual manner, of a simple cylinder and piston, and provided with valves on each side, at top and bottom, at the points $a\ a'\ a''\ a'''$, of which $a$ and $a'$ regulate communication with the open air, and $a''$ and $a'''$ with the chamber A, the arrangement of which is such that the air is always drawn in at the points $a\ a'$ and forced out at $a''\ a'''$ into the chamber A by the action of the pump. To accomplish this, it is necessary that when the piston is rising, the valves $a\ a''$ should be closed and $a'$ $a'''$ be open. The air above the piston is forced into the chamber A at $a'''$, while the vacuum occasioned below the piston by its movement is filled by air admitted at $a'$. The downward movement of the piston reverses the operation, the valves $a'$ and $a'''$ being closed and $a$ and $a''$ open. The air-pump $c$ is connected with the hot-air engine $c'$ by means of the walking-beam W. The air also is conveyed from the chamber A of the pump to the chamber A' of the engine by means of the curved pipes I and vessels F. The engine $c'$ consists also of a simple cylinder and piston provided with suitable valves $b\ b'\ b''\ b'''$, which are operated by means of connection with the walking-beam W. Its piston has, however, double the area of the piston of the pump. When the piston is rising in this case, the valves $b\ b''$ are closed and $b'\ b'''$ are opened, the operation being reversed when the piston descends. It will be readily perceived that by this arrangement, when the engine is working the air must flow in a constant stream from the openings $a\ a'$, through the pump $c$, chamber A, pipes I, vessels F, chamber A', engine $c'$, and blast-pipe L, into the furnace, as shown at T.

N N N represent openings in the top of the furnace, where the gases and waste heat escape. As it is this waste heat that I propose to utilize, I place the chamber H over the openings N N N, within which are arranged the semi-cylindrical vessels F and pipes I. The main pipe from the chamber A enters on the lower side of the first vessel F at its centre, from the top of which rise U-shaped branch-pipes, being inverted, which connect with the top of the next vessel. Similar pipes connect this with the next, until the last is reached, and a single pipe attached at its bottom, completes the connection with the chamber A'. The object of this peculiar arrangement of pipes and vessels is to expose the air passing through them most thoroughly to the action of the heat, for, after having passed the vessels F, the heat still continues to act upon the pipes I.

The operation of my invention is as follows: The furnace being in operation, the waste heat rising through the openings N enters the chamber H and acts upon the vessels F and pipes I. The air in these receiving a heat of 600°, more than doubles its volume, and necessarily seeks an outlet. Moving in each direction in the pipes I, it encounters, on one side, the piston of the pump $c$, and on the other that of the engine $c'$, but as the area of the latter is twice that of the former, the latter receives the greater pressure, and is compelled to give way before the force exerted by the heated and confined air. Thus it will be seen that power is applied to the engine, and through it to the pump, by means of air rendered effective by waste heat. From the engine the hot air is forced down the blast-pipe L, and is conducted thereby to the furnace. If desired, the waste heat could be readily conveyed down from the cupola in suitable pipes, and in this case the machinery could be placed upon the ground.

My invention can also be applied to ranges, furnaces, &c., used for dwellings. The power thus obtained by utilizing the waste heat may be also applied to other purposes besides that of furnishing a hot-air blast.

Having thus described my invention, what I claim as new, and desire to secure by Letters Patent, is—

The engine $c'$, pump $c$, pipes I, vessels F, and chamber H, when combined substantially as and for the purpose explained.

THEO. McDOWELL.

Witnesses:
J. W. MISTER,
A. M. TANNER.